(12) United States Patent
Hirano et al.

(10) Patent No.: US 11,554,427 B2
(45) Date of Patent: Jan. 17, 2023

(54) CUTTING INSERT AND METHOD FOR MANUFACTURING CUTTING INSERT

(71) Applicant: SUMITOMO ELECTRIC HARDMETAL CORP., Itami (JP)

(72) Inventors: Tsutomu Hirano, Itami (JP); Satoru Kukino, Itami (JP)

(73) Assignee: SUMITOMO ELECTRIC HARDMETAL CORP., Itami (JP)

(*) Notice: Subject to any disclaimer, the term of this patent is extended or adjusted under 35 U.S.C. 154(b) by 157 days.

(21) Appl. No.: 16/631,267

(22) PCT Filed: May 18, 2018

(86) PCT No.: PCT/JP2018/019311
§ 371 (c)(1),
(2) Date: Jan. 15, 2020

(87) PCT Pub. No.: WO2019/017064
PCT Pub. Date: Jan. 24, 2019

(65) Prior Publication Data
US 2020/0215618 A1    Jul. 9, 2020

(30) Foreign Application Priority Data

Jul. 19, 2017   (JP) .............................. JP2017-140115

(51) Int. Cl.
*B23B 27/10* (2006.01)
*B23C 5/20* (2006.01)
(Continued)

(52) U.S. Cl.
CPC .............. *B23C 5/202* (2013.01); *B23B 27/10* (2013.01); *B23B 27/14* (2013.01); *B23C 5/28* (2013.01);
(Continued)

(58) Field of Classification Search
CPC ..... B23B 27/10; B23B 2200/128; B23C 5/28; B23C 2200/128
See application file for complete search history.

(56) References Cited

U.S. PATENT DOCUMENTS 5,439,327 A   8/1995 Wertheim
5,775,854 A   7/1998 Wertheim
(Continued)

FOREIGN PATENT DOCUMENTS

DE         504275      * 12/1926
EP      0138031 A2      4/1985
(Continued)

*Primary Examiner* — Alan Snyder
(74) *Attorney, Agent, or Firm* — Faegre Drinker Biddle & Reath LLP

(57) ABSTRACT

A cutting insert according to one embodiment includes: a rake face; a flank face continuous to the rake face; and a cutting edge constituted of a ridgeline between the rake face and the flank face. A coolant flow path is provided inside the cutting insert. One end portion of the coolant flow path opens in the flank face to form a coolant ejection hole. The flank face is provided with a coolant guide groove extending from the coolant ejection hole toward the cutting edge with a base end portion of the coolant guide groove being connected to the coolant ejection hole and with a front end portion of the coolant guide groove being disposed at a position close to the cutting edge relative to the base end portion.

8 Claims, 4 Drawing Sheets

(51) Int. Cl.
  *B23B 27/14* (2006.01)
  *B23P 15/28* (2006.01)
  *B23C 5/28* (2006.01)

(52) U.S. Cl.
  CPC ......... *B23P 15/28* (2013.01); *B23B 2200/128* (2013.01); *B23B 2222/28* (2013.01); *B23B 2224/00* (2013.01); *B23B 2226/125* (2013.01); *B23B 2250/12* (2013.01); *B23C 2200/128* (2013.01); *B23C 2250/12* (2013.01)

(56) References Cited

U.S. PATENT DOCUMENTS

| | | |
|---|---|---|
| 2001/0007215 A1 | 7/2001 | Murata et al. |
| 2007/0006694 A1 | 1/2007 | Fujimoto et al. |
| 2012/0082518 A1* | 4/2012 | Woodruff ................ B23C 5/207 407/11 |
| 2016/0158855 A1 | 6/2016 | Kondameedi et al. |

FOREIGN PATENT DOCUMENTS

| | | |
|---|---|---|
| JP | H05-237706 A | 9/1993 |
| JP | H05-301104 A | 11/1993 |
| JP | 2001-198708 A | 7/2001 |
| JP | 2008-238342 A | 10/2008 |
| JP | 2010-179412 A | 8/2010 |
| JP | 2013-49106 A | 3/2013 |
| JP | 2016-190275 A | 11/2016 |

* cited by examiner

CUTTING INSERT AND METHOD FOR MANUFACTURING CUTTING INSERT

TECHNICAL FIELD

The present disclosure relates to a cutting insert and a method for manufacturing the cutting insert. The present application claims a priority based on Japanese Patent Application No. 2017-140115 filed on Jul. 19, 2017, the entire content of which is incorporated herein by reference.

BACKGROUND ART

Conventionally, a cutting insert described in Japanese Patent Laying-Open No. 2016-190275 (Patent Literature 1) has been known. In a flank face of the cutting insert described in Patent Literature 1, a coolant holding portion is formed. The coolant holding portion is constituted of a plurality of grooves and a plurality of ribs formed in the flank face.

The cutting insert described in Patent Literature 1 is attached to a tool body. Inside the tool body, a path for supplying the coolant is formed. This path opens in a surface of the tool body, thereby forming a coolant supply hole. Part of coolant sent out from the coolant supply hole is ejected onto the flank face of the cutting insert described in Patent Literature 1, and is accordingly supplied to the coolant holding portion.

CITATION LIST

Patent Literature

PTL 1: Japanese Patent Laying-Open No. 2016-190275

SUMMARY OF INVENTION

A cutting insert according to one embodiment of the present disclosure includes: a rake face; a flank face continuous to the rake face; and a cutting edge constituted of a ridgeline between the rake face and the flank face. A coolant flow path is provided inside the cutting insert. One end portion of the coolant flow path opens in the flank face to form a coolant ejection hole. The flank face is provided with a coolant guide groove extending from the coolant ejection hole toward the cutting edge with a base end portion of the coolant guide groove being connected to the coolant ejection hole and with a front end portion of the coolant guide groove being disposed at a position close to the cutting edge relative to the base end portion.

A method for manufacturing a cutting insert according to one embodiment of the present disclosure is a method for manufacturing the above-described cutting insert. The method for manufacturing the cutting insert according to one embodiment of the present disclosure includes: preparing a shaped body for the cutting insert; forming the rake face, the flank face, and the cutting edge in the shaped body; forming the coolant flow path inside the shaped body and forming the coolant ejection hole in the flank face; and forming the coolant guide groove in the flank face.

DETAILED DESCRIPTION

Figure 1:
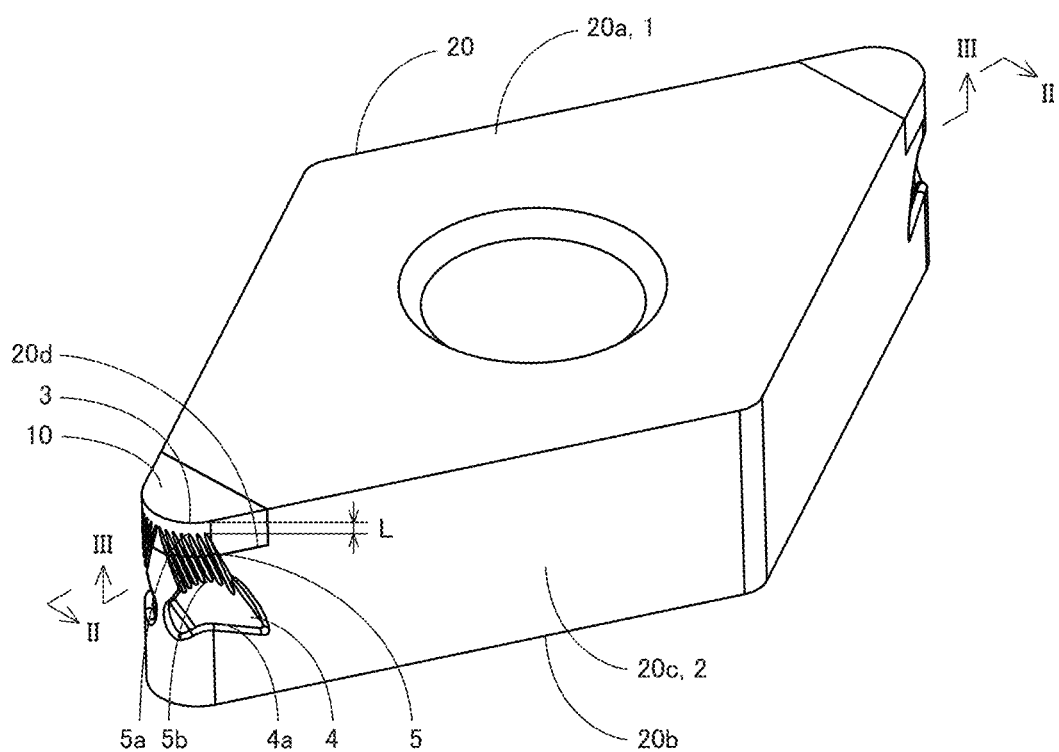
FIG. 1 is a perspective view of a cutting insert according to an embodiment.

[Problem to be Solved by the Present Disclosure]

In the cutting insert described in Patent Literature 1, the coolant supply hole that opens in the surface of the tool body is disposed at a position away from the coolant holding portion formed in the cutting insert. Particularly, when a plate is disposed between the cutting insert and the tool body, the coolant supply hole is further away from the coolant holding portion. Moreover, when cutting a workpiece using the cutting insert described in Patent Literature 1, the flank face of the cutting insert and the workpiece are in close contact with each other or a space therebetween is very small. Therefore, in the cutting tool described in Patent Literature 1, most of the coolant sent out from the coolant supply hole is blocked by the workpiece, and very small part of the coolant is actually supplied to the coolant holding portion. As a result, in the cutting insert described in Patent Literature 1, there is still room for improvement in order to sufficiently cool and lubricate the cutting edge.

The present disclosure has been made in view of the above-described problem of the conventional art. More specifically, the present disclosure provides: a cutting insert in which coolant can be supplied to a vicinity of a cutting edge more securely than in the conventional art; and a method for manufacturing such a cutting insert.

[Advantageous Effect of the Present Disclosure]

According to the cutting insert according to one embodiment of the present disclosure, coolant can be supplied to the vicinity of the cutting edge more securely. According to the method for manufacturing the cutting insert according to one embodiment of the present disclosure, there can be obtained a cutting insert in which coolant can be supplied to the vicinity of the cutting edge more securely.

[Description of Embodiments]

First, embodiments of the present disclosure are listed and described.

(1) A cutting insert according to one embodiment of the present disclosure includes: a rake face; a flank face continuous to the rake face; and a cutting edge constituted of a ridgeline between the rake face and the flank face. A coolant flow path is provided inside the cutting insert. One end portion of the coolant flow path opens in the flank face to form a coolant ejection hole. The flank face is provided with a coolant guide groove extending from the coolant ejection hole toward the cutting edge with a base end portion of the coolant guide groove being connected to the coolant ejection hole and with a front end portion of the coolant guide groove being disposed at a position close to the cutting edge relative to the base end portion.

In the cutting insert according to (1), even when the flank face and the workpiece are in close contact with each other, a path through which the coolant flows is secured between the coolant guide groove and the workpiece. Therefore, in the cutting insert according to (1), the coolant can be more securely supplied to a vicinity of the cutting edge.

(2) In the cutting insert according to (1), a cross sectional area of the coolant guide groove in a cross section parallel to the rake face may become smaller from the base end portion toward the front end portion.

In the cutting insert according to (2), the cross sectional area of the coolant guide groove is small at the cutting edge side, thereby suppressing a decrease in strength of the cutting insert in the vicinity of the cutting edge. In the cutting insert according to (2), as the cross sectional area of the coolant guide groove becomes smaller, the coolant is pushed out to the vicinity of the cutting edge. Therefore, according to the cutting insert according to (2), the coolant can be more securely supplied to the vicinity of the cutting edge while suppressing the decrease in strength of the cutting insert in the vicinity of the cutting edge.

(3) In the cutting insert according to (1), the coolant guide groove may have a depth of more than or equal to 0.2 mm and less than or equal to 2 mm.

According to the cutting insert according to (3), the coolant can be suppressed from being less likely to enter the coolant guide groove due to an influence of surface tension of the coolant.

(4) A method for manufacturing a cutting insert according to one embodiment of the present disclosure is a method for manufacturing the above-described cutting insert. The method for manufacturing the cutting insert according to one embodiment of the present disclosure includes: preparing a shaped body for the cutting insert; forming the rake face, the flank face, and the cutting edge in the shaped body; forming the coolant flow path inside the shaped body and forming the coolant ejection hole in the flank face; and forming the coolant guide groove in the flank face.

According to the method for manufacturing the cutting insert according to (4), there can be obtained a cutting insert in which the coolant can be more securely supplied in the vicinity of the cutting edge.

[Details of Embodiments of the Present Disclosure]

Next, embodiments of the present disclosure will be described with reference to figures. It should be noted that the same or corresponding portions in the figures are given the same reference characters. Moreover, at least parts of the embodiments described below may be appropriately combined.

(Configuration of Cutting Insert According to Embodiment)

The following describes a configuration of a cutting insert according to an embodiment.

FIG. 1 is a perspective view of the cutting insert according to the embodiment. As shown in FIG. 1, the cutting insert according to the embodiment has a rake face 1, a flank face 2, and a cutting edge 3. Flank face 2 is continuous to rake face 1. Cutting edge 3 is constituted of a ridgeline between rake face 1 and flank face 2.

The cutting insert according to the embodiment has a cutting edge tip 10 and a substrate 20. Cutting edge tip 10 is composed of CBN (cubic boron nitride), PCD (polycrystal diamond), or the like, for example. Substrate 20 is composed of cemented carbide, for example. Cutting edge 3 is formed at cutting edge tip 10. The cutting insert according to the embodiment may be constituted only of substrate 20. It should be noted that in this case, a below-described attachment portion 20d is not provided in substrate 20, and cutting edge 3 is formed in substrate 20.

Substrate 20 has a top surface 20a, a backside surface 20b, and a side surface 20c. Backside surface 20b is a surface opposite to top surface 20a. Side surface 20c is continuous to top surface 20a and backside surface 20b. Top surface 20a is a surface to serve as rake face 1. Side surface 20c is a surface to serve as flank face 2.

Top surface 20a is provided with attachment portion 20d. Attachment portion 20d is disposed at a nose curvature portion of substrate 20. In top surface 20a, a level difference in a direction from top surface 20a toward backside surface 20b is provided at attachment portion 20d. Cutting edge tip 10 is attached to attachment portion 20d. Cutting edge tip 10 is attached to attachment portion 20d by way of brazing, for example.

Figure 2:
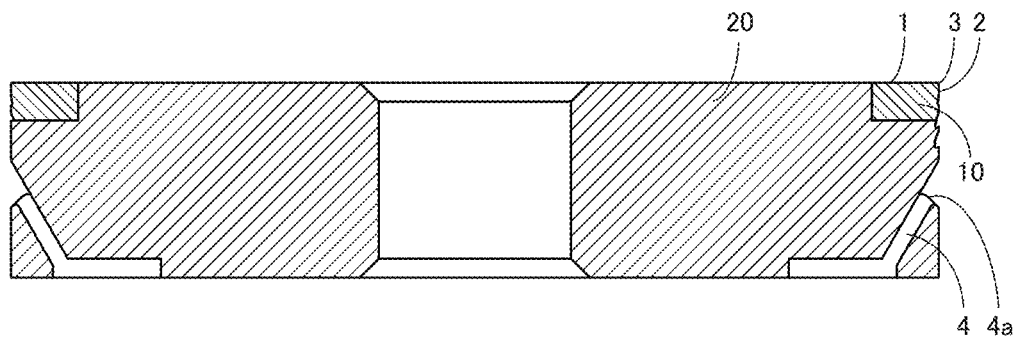
FIG. 2 is a cross sectional view along II-II in FIG. 1.

FIG. 2 is a cross sectional view along II-II in FIG. 1. As shown in FIG. 2, a coolant flow path 4 is provided inside the cutting insert according to the embodiment. Coolant flow path 4 is connected to flank face 2. From another viewpoint, it is said that one end portion of coolant flow path 4 opens in flank face 2 to form a coolant ejection hole 4a. Coolant flows in coolant flow path 4. Coolant flow path 4 is preferably inclined such that a distance between coolant flow path 4 and cutting edge 3 becomes smaller as coolant flow path 4 is closer to flank face 2.

As shown in FIG. 1, a coolant guide groove 5 is provided in flank face 2. Coolant guide groove 5 is connected to coolant flow path 4 in flank face 2. That is, a second end 5b (base end portion) of coolant guide groove 5 is connected to coolant ejection hole 4a. Coolant guide groove 5 extends from coolant flow path 4 toward cutting edge 3. That is, a first end 5a (front end portion) of coolant guide groove 5 is disposed at a position close to cutting edge 3 relative to second end 5b. One or a plurality of coolant guide grooves 5 may be provided.

Figure 3:
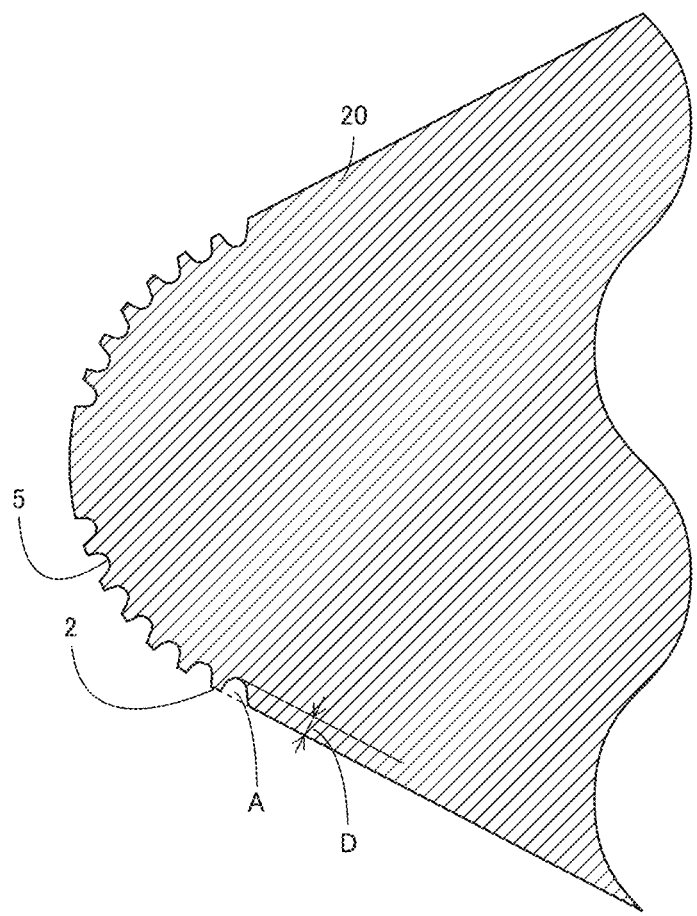
FIG. 3 is a cross sectional view along in FIG. 1.

FIG. 3 is a cross sectional view along in FIG. 1. III-III represents a cross section parallel to rake face 1. As shown in FIG. 2, flank face 2 is depressed at coolant guide groove 5. Coolant guide groove 5 has a cross sectional area A. Cross sectional area A is a cross sectional area of coolant guide groove 5 in the cross section parallel to rake face 1. Cross sectional area A is an area of a portion surrounded, in the cross section parallel to rake face 1, by a wall surface of coolant guide groove 5 and a straight line that connects the both ends of coolant guide groove 5.

Cross sectional area A of coolant guide groove 5 preferably becomes smaller from the coolant flow path 4 side toward the cutting edge 3 side (from the second end 5b side toward the first end 5a side). Coolant guide groove 5 has a curved cross sectional shape in the cross section parallel to rake face 1, for example. It should be noted that the cross sectional shape of coolant guide groove 5 in the cross section parallel to rake face 1 is not limited to this. Coolant guide groove 5 in the cross section parallel to rake face 1 may have a rectangular cross sectional shape, for example.

Coolant guide groove 5 has a depth D. Depth D is a distance between the bottom of coolant guide groove 5 and the straight line that connects the both ends of coolant guide groove 5 in the cross section parallel to rake face 1. Depth D is preferably more than or equal to 0.2 mm and less than or equal to 2.0 mm.

As shown in FIG. 1, coolant guide groove 5 has first end 5a and second end 5b. First end 5a is an end at the cutting edge 3 side. Second end 5b is an end at a side opposite to first end 5a. That is, second end 5b is an end at the coolant flow path 4 side. First end 5a is disposed to be separated from cutting edge 3 by a distance L. Distance L is a distance between cutting edge 3 and first end 5a in a direction orthogonal to cutting edge 3. Preferably, distance L is more than or equal to 0.3 mm and less than or equal to 1.5 mm. Distance L is more preferably more than or equal to 0.3 mm and less than or equal to 1.0 mm. Coolant guide groove 5 preferably extends such that first end 5a reaches cutting edge tip 10.

(Method for Manufacturing Cutting Insert According to Embodiment)

The following describes a method for manufacturing the cutting insert according to the embodiment.

Figure 4:
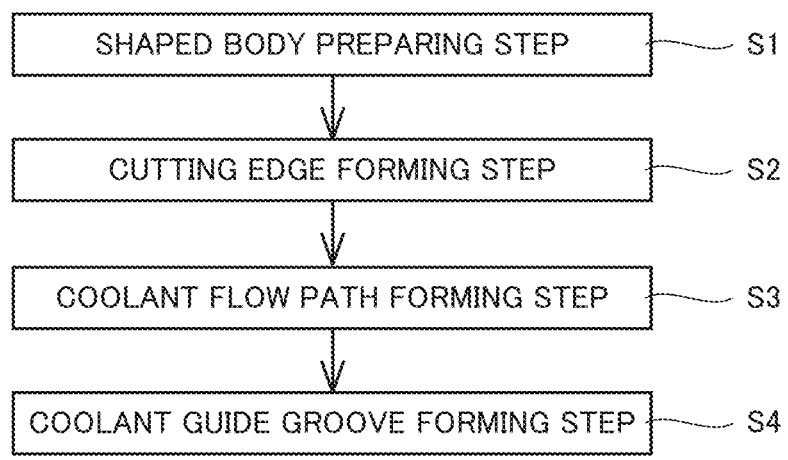
FIG. 4 is a flowchart showing a method for manufacturing the cutting insert according to the embodiment.

FIG. 4 is a flowchart showing the method for manufacturing the cutting insert according to the embodiment. As shown in FIG. 4, the method for manufacturing the cutting insert according to the embodiment includes a shaped body preparing step S1, a cutting edge forming step S2, a coolant flow path forming step S3, and a coolant guide groove forming step S4.

In shaped body preparing step S1, a shaped body is prepared, which is to serve as the cutting insert according to the embodiment by performing cutting edge forming step S2, coolant flow path forming step S3, and coolant guide groove forming step S4. The shaped body has a first portion and a second portion. The first portion is a portion to serve as cutting edge tip 10 by performing cutting edge forming step S2, coolant flow path forming step S3, and coolant guide groove forming step S4. The second portion is a portion to serve as substrate 20 by performing cutting edge forming step S2, coolant flow path forming step S3, and coolant guide groove forming step S4. The first portion is prepared by sintering CBN powder, PCD powder or the like. The second portion is prepared by sintering a mixture of WC (tungsten carbide) and a binder such as Co (cobalt). The shaped body is obtained by fixing the first portion and the second portion to each other by way of brazing or the like.

In cutting edge forming step S2, rake face 1 and flank face 2 are formed at surfaces of the shaped body prepared in shaped body preparing step S1. As a result, cutting edge 3 is formed in cutting edge forming step S2. In cutting edge forming step S2, rake face 1, flank face 2, and cutting edge 3 are formed by polishing the surfaces of the shaped body, for example.

In coolant flow path forming step S3, coolant flow path 4 is formed inside the shaped body prepared in shaped body preparing step S1. In coolant flow path forming step S3, coolant flow path 4 is formed by drilling the shaped body, for example.

In coolant guide groove forming step S4, coolant guide groove 5 is formed in the shaped body prepared in shaped body preparing step S1. Coolant guide groove 5 is formed by emitting laser to flank face 2 (or the surface of the shaped body to serve as flank face 2 by performing cutting edge forming step S2) so as to remove a portion of the shaped body, for example.

In the description above, cutting edge forming step S2, coolant flow path forming step S3, and coolant guide groove forming step S4 may be performed in any order. For example, coolant guide groove forming step S4 may be performed after performing coolant flow path forming step S3, and then cutting edge forming step S2 may be performed. Alternatively, cutting edge forming step S2 may be performed after coolant flow path forming step S3, and then coolant guide groove forming step S4 may be performed.

Figure 5:
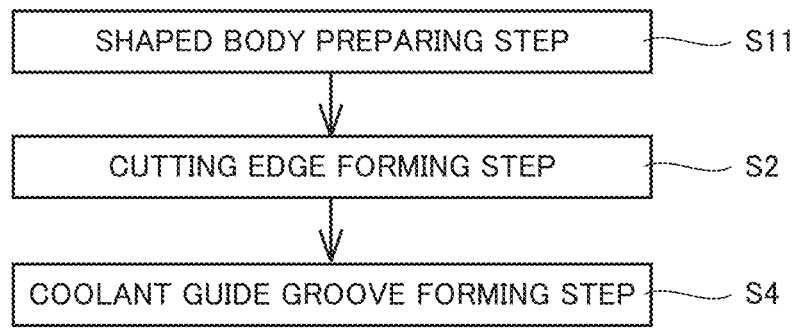
FIG. 5 is a flowchart showing another exemplary method for manufacturing the cutting insert according to the embodiment.

FIG. 5 is a flowchart showing another exemplary method for manufacturing the cutting insert according to the embodiment. As shown in FIG. 5, the method for manufacturing the cutting insert according to the embodiment includes a shaped body preparing step S11, cutting edge forming step S2, and coolant guide groove forming step S4. In shaped body preparing step S11, a shaped body having coolant flow path 4 provided therein is prepared. In other words, when preparing the shaped body, coolant flow path 4 may be formed simultaneously (the step of forming coolant flow path 4 may be included in the step of preparing the shaped body).

(Effect of Cutting Insert According to Embodiment)

The following describes an effect of the cutting insert according to the embodiment.

Figure 6:
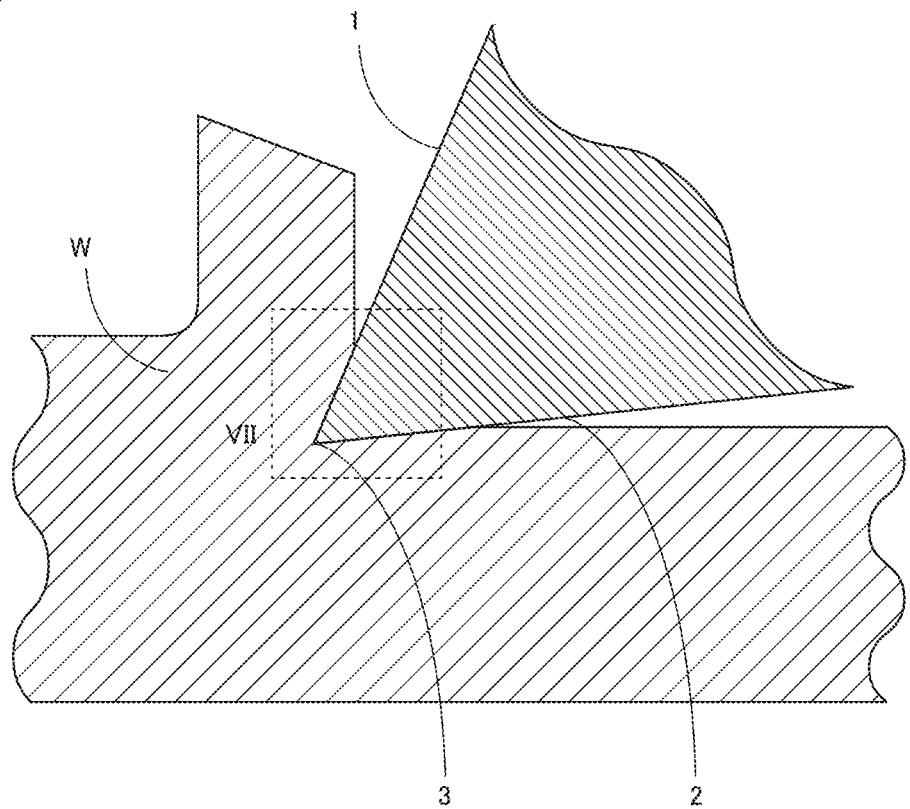
FIG. 6 is a schematic view of cutting using the cutting insert according to the embodiment.

FIG. 6 is a schematic view of cutting using the cutting insert according to the embodiment. As shown in FIG. 6, a workpiece W and flank face 2 are in close contact with each other in the cutting using the cutting insert according to the embodiment. Therefore, coolant supplied from outside the cutting insert according to the embodiment is less likely to reach the vicinity of cutting edge 3.

Figure 7:
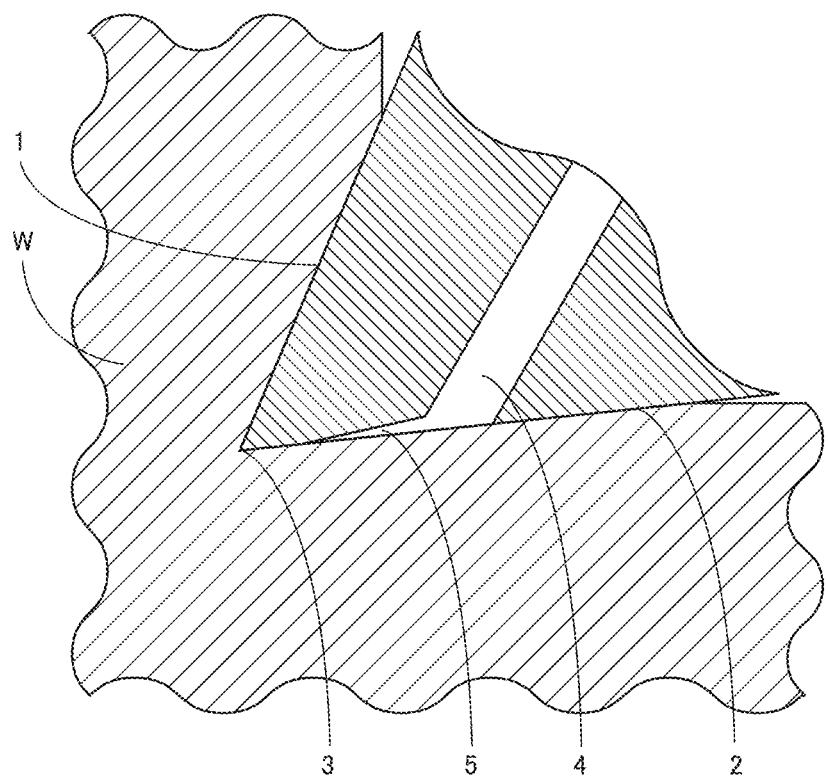
FIG. 7 is an enlarged view of a region VII in FIG. 6.

FIG. 7 is an enlarged view of a region VII in FIG. 6. As shown in FIG. 6, in the cutting insert according to the embodiment, coolant guide groove 5 is provided in flank face 2. Since flank face 2 is depressed at coolant guide groove 5, there is a space between workpiece W and coolant guide groove 5 even when flank face 2 and workpiece W are in close contact with each other. As described above, coolant guide groove 5 is connected to coolant flow path 4 in flank face 2. Moreover, as described above, coolant guide groove 5 extends from coolant flow path 4 toward cutting edge 3. Therefore, in the cutting insert according to the embodiment, the coolant flowing through coolant flow path 4 is more securely supplied to the vicinity of cutting edge 3 via the space defined by workpiece W and coolant guide groove 5.

In the portion in which coolant guide groove 5 is formed, the thickness of the cutting insert according to the embodiment is decreased, thus resulting in decreased strength. Since cutting force is applied to the vicinity of the cutting edge during cutting, the strength in the vicinity of the cutting edge has a large influence over durability of the cutting insert.

In the cutting insert according to the embodiment, when cross sectional area A becomes smaller from the coolant flow path 4 side toward the cutting edge 3 side, the strength of the cutting insert at the side close to cutting edge 3 can be suppressed from being decreased. Moreover, in this case, as cross sectional area A becomes smaller, the coolant is pushed out from coolant guide groove 5 toward cutting edge 3. Therefore, in this case, the coolant can be more securely supplied to the vicinity of cutting edge 3 while suppressing the decrease in strength of the cutting insert in the vicinity of the cutting edge.

When the depth of coolant guide groove 5 is too small, the coolant may become less likely to enter coolant guide groove 5 due to surface tension of the coolant. In the cutting insert according to the embodiment, when depth D is more than or equal to 0.2 mm and less than or equal to 2.0 mm, the coolant can be suppressed from being less likely to enter coolant guide groove 5 due to an influence of the surface tension of the coolant.

In the cutting tool according to the embodiment, when coolant flow path 4 is provided in flank face 2 and is inclined to attain a smaller distance between coolant flow path 4 and cutting edge 3, the coolant flowing through coolant flow path 4 is facilitated to flow into between workpiece W and coolant guide groove 5 during the cutting. Therefore, in this case, the coolant is facilitated to be supplied more securely to the vicinity of cutting edge 3.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: rake face; 2: flank face; 3: cutting edge; 4: coolant flow path; 4a: coolant ejection hole; 5: coolant guide groove; 5a: first end; 5b: second end; 10: cutting edge tip; 20: substrate; 20a: top surface; 20b: backside surface; 20c: side surface; 20d: attachment portion; A: cross sectional area; D: depth; L: distance; S1: shaped body preparing step; S11: shaped body preparing step; S2: cutting edge forming step; S3: coolant flow path forming step; S4: coolant guide groove forming step; W: workpiece.

The invention claimed is:

1. A cutting insert comprising: a rake face; a flank face continuous to the rake face; and a cutting edge constituted of a ridgeline between the rake face and the flank face, wherein
    a coolant flow path is provided inside the cutting insert,
    one end portion of the coolant flow path opens in the flank face to form a coolant ejection hole,
    the flank face is provided with a coolant guide groove extending from the coolant ejection hole toward the cutting edge with a base end portion of the coolant guide groove being connected to the coolant ejection hole and with a front end portion of the coolant guide groove being disposed at a position close to the cutting edge relative to the base end portion,
    the coolant flow path is inclined such that a distance between the coolant flow path and the cutting edge becomes smaller as the coolant flow path is closer to the flank face,
    the cutting insert is constituted of a cutting edge tip composed of cubic boron nitride and a substrate composed of cemented carbide,
    the cutting edge tip is attached to the substrate,
    the coolant ejection hole is at the flank face which is located at the substrate, and
    the coolant guide groove extends into the flank face of the cutting edge tip.

2. The cutting insert according to claim 1, wherein a cross sectional area of the coolant guide groove in a cross section parallel to the rake face becomes smaller from the base end portion toward the front end portion.

3. The cutting insert according to claim 2, wherein
    the cross sectional area is an area of a portion surrounded, in the cross section parallel to the rake face, by a wall surface of the coolant guide groove and a straight line that connects both ends of the coolant guide groove.

4. The cutting insert according to claim 1, wherein the coolant guide groove has a depth of more than or equal to 0.2 mm and less than or equal to 2 mm.

5. The cutting insert according to claim 1, wherein
    the coolant guide groove has a curved cross sectional shape in a cross section parallel to the rake face.

6. The cutting insert according to claim 1, wherein
    the coolant guide groove has a rectangular cross sectional shape in a cross section parallel to the rake face.

7. The cutting insert according to claim 1, wherein
    the coolant guide groove has a first end and a second end,
    the first end is an end of the coolant guide groove at a side of the cutting edge,
    the second end is an end of the coolant guide groove at a side of the coolant flow path, and
    a distance between the cutting edge and the first end in a direction orthogonal to the cutting edge is equal to or more than 0.3 mm and less than or equal to 1.5 mm.

8. A method for manufacturing the cutting insert recited in claim 1, the method comprising:
    preparing a shaped body for the cutting insert;
    forming the rake face, the flank face, and the cutting edge in the shaped body;
    forming the coolant flow path inside the shaped body and forming the coolant ejection hole in the flank face; and
    forming the coolant guide groove in the flank face.

* * * * *